United States Patent
Maurer et al.

(10) Patent No.: US 9,358,903 B2
(45) Date of Patent: Jun. 7, 2016

(54) ADJUSTMENT ARRANGEMENT FOR A MOTOR VEHICLE SEAT

(71) Applicant: Dr. Ing. h.c. F. Porsche Aktiengesellschaft, Stuttgart (DE)

(72) Inventors: Simon Alexander Maurer, Stuttgart (DE); Dieter Jungert, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 84 days.

(21) Appl. No.: 14/270,869

(22) Filed: May 6, 2014

(65) Prior Publication Data

US 2014/0332656 A1    Nov. 13, 2014

(30) Foreign Application Priority Data

May 8, 2013  (DE) .................. 10 2013 104 748

(51) Int. Cl.
*B60N 2/427* (2006.01)
*B60N 2/07* (2006.01)
*B60N 2/16* (2006.01)

(52) U.S. Cl.
CPC ............ *B60N 2/0722* (2013.01); *B60N 2/1615* (2013.01); *B60N 2/42709* (2013.01); *B60N 2/42736* (2013.01)

(58) Field of Classification Search
CPC .... B60N 2/1615; B60N 2/42736; B60N 2/43; B60N 2/42709
See application file for complete search history.

(56) References Cited

U.S. PATENT DOCUMENTS

| 2,823,730 | A | | 2/1958 | Lawrence | |
|---|---|---|---|---|---|
| 5,782,533 | A | * | 7/1998 | Fischer | B60N 2/06 248/421 |
| 6,176,543 | B1 | * | 1/2001 | Nawata | B60N 2/1615 296/187.11 |
| 6,595,502 | B2 | | 7/2003 | Koch | |
| 8,353,558 | B2 | * | 1/2013 | Okamoto | B60N 2/1615 297/216.1 |
| 8,926,012 | B2 | * | 1/2015 | Kaessner | B60N 2/4221 297/216.19 |

(Continued)

FOREIGN PATENT DOCUMENTS

| CN | 1473122 | 2/2004 |
|---|---|---|
| CN | 101890916 | 11/2010 |

(Continued)

OTHER PUBLICATIONS

German Search Report, dated Mar. 3, 2014, corresponding to counterpart German Patent Application No. 10 2013 104 748.3.

(Continued)

*Primary Examiner* — Bradley Duckworth
(74) *Attorney, Agent, or Firm* — RatnerPrestia

(57) ABSTRACT

An adjustment arrangement for a seat of a motor vehicle including a rail which is mounted displaceably in a longitudinal direction of the vehicle relative to a frame of the vehicle, a seat support which forms a retainer for the seat, a connecting element which mechanically couples the seat support to the rail, wherein a first section of the connecting element is mounted on the rail so as to be rotatable in a predefined pivoting plane, wherein a second section of the connecting element is mounted on the seat support so as to be rotatable in the pivoting plane, and wherein the connecting element is functionally rotatable relative to the seat support and/or to the rail up to a predefined adjustment limit, and further including an absorber unit which is designed to absorb kinetic energy introduced by the connecting element, if the connecting element exceeds the predefined adjustment limit.

10 Claims, 2 Drawing Sheets

(56) References Cited

U.S. PATENT DOCUMENTS

| | | | | |
|---|---|---|---|---|
| 2010/0148532 A1* | 6/2010 | Jungert | ................ | B60N 2/0232 296/65.18 |
| 2010/0187396 A1* | 7/2010 | Gilbert | ................ | B60N 2/0232 248/371 |
| 2012/0126592 A1* | 5/2012 | Kaessner | ........... | B60N 2/42709 297/216.1 |
| 2012/0146370 A1* | 6/2012 | Lee | ...................... | B60N 2/4228 297/216.14 |
| 2013/0038098 A1 | 2/2013 | Maier | | |
| 2013/0214112 A1* | 8/2013 | Kawamura | ............... | B60N 2/08 248/429 |
| 2013/0307301 A1* | 11/2013 | Munemura | .......... | B60N 2/4228 297/216.13 |
| 2015/0035327 A1* | 2/2015 | Ferenc | ................. | B60N 2/4235 297/216.1 |

FOREIGN PATENT DOCUMENTS

| | | |
|---|---|---|
| CN | 201729079 | 2/2011 |
| CN | 102897072 | 1/2013 |
| DE | 102007039862 A1 | 2/2009 |
| FR | 1371788 | 9/1964 |

OTHER PUBLICATIONS

Chinese Office Action for Chinese Application No. 2014101580521, dated Jan. 13, 2016.

* cited by examiner

CROSS-REFERENCE TO RELATED APPLICATIONS

This application claims priority to German Patent Application No. 10 2013 104 748.3, filed May 8, 2013, which is incorporated by reference herein in its entirety.

FIELD OF THE INVENTION

The present invention relates to an adjustment arrangement for a seat of a motor vehicle, comprising a rail which is mounted displaceably in a longitudinal direction of the motor vehicle relative to a frame of the motor vehicle, a seat support which forms a retainer for the seat, and comprising a connecting element which mechanically couples the seat support to the rail.

BACKGROUND OF THE INVENTION

Various adjustment mechanisms for a motor vehicle seat are known from the prior art. The extent and the differentiation of the seat adjustment are substantially dependent on the level of comfort and equipment of the motor vehicle. Customarily, the position of the two front motor vehicle seats can be displaced forward and rearward on what are referred to as seat rails, in order to enable individuals of different heights to readily operate the gas, brake and optionally clutch pedals. This is generally referred to as a linear seat adjustment or two-way adjustment. In most cases, the inclination of a backrest of the motor vehicle seat can also be adjusted. In the case of comfortably equipped motor vehicle seats, the adjustment mechanism additionally permits, for example, adjustment of the height and of the seat inclination of the motor vehicle seat. What is referred to as a six-way seat adjustment therefore includes the adjustability of the seat in the horizontal and vertical directions and also the adjustment of the inclination of the backrest. The adjustment of the motor vehicle seat can be carried out here, for example, with the aid of lateral hand wheels, levers with a pumping movement or via switches with electrical or electro-hydraulic support.

The adjustment mechanism typically has rockers which are mounted in an articulated manner and are operable by motor or else manually. In a known manner, for example, a front rocker and a rear rocker are provided in each case on the left and right sides of the vehicle seat, said rockers being connected in each case by means of pivot points to the seat/the seat trough and also to a rail, which is mounted displaceably in the longitudinal direction of the motor vehicle on a vehicle floor.

In the event of an impact of the motor vehicle against an obstacle or the like, an occupant on the motor vehicle seat is very severely accelerated relative to the motor vehicle seat. This may result in injuries to the vehicle occupant. In addition, the high acceleration forces cause high torques at the pivot points of the rockers. This, in turn, can lead to an overloading of the vehicle seat, in which individual components of the adjustment mechanism (for example the rockers) are destroyed or severed.

DE 10 2007 039 862 A1, which is incorporated by reference herein, discloses a seat height adjustment device for a motor vehicle seat, in which a seat support is connected to a longitudinal adjustment rail by means of a front and a rear pivoting support. Each pivoting support is coupled rotatably to the longitudinal adjustment rail via a first coupling point and to the seat support via a second coupling point. Each pivoting support here comprises a subregion with a width which is reduced transversely with respect to a longitudinal axis of the pivoting support and is arranged between the respective coupling points. In the event of an impact of the motor vehicle, the pivoting supports are deformed or buckled in relation to the longitudinal axis in the predetermined weakened subregion as a consequence of the actions of force.

However, the structure of the motor vehicle seat is weakened in general by this measure. Age-induced material fatigue can therefore also result in a deformation of the pivoting supports and therefore in a functional impediment of the adjustment mechanism. Furthermore, there is the risk of the pivoting supports being severed in the event of a vehicle impact and therefore of a higher risk of injury for the vehicle occupants arising.

Against this background, it would be beneficial to specify an improved adjustment mechanism for a motor vehicle seat, said adjustment mechanism avoiding the above disadvantages.

SUMMARY OF THE INVENTION

According to aspects of the invention, an adjustment arrangement for a seat of a motor vehicle comprises a rail which is mounted displaceably in a longitudinal direction of the motor vehicle relative to a floor of the motor vehicle, a seat support which forms a retainer for the seat, a connecting element which mechanically couples the seat support to the rail, wherein a first section of the connecting element is mounted on the rail so as to be rotatable in a predefined pivoting plane, wherein a second section of the connecting element is mounted on the seat support so as to be rotatable in the pivoting plane, and wherein the connecting element is functionally rotatable relative to the seat support and/or to the rail up to a predefined adjustment limit, and comprises an absorber unit which is designed to absorb kinetic energy introduced by means of the connecting element, if the connecting element exceeds the predefined adjustment limit.

In the present case, a functional rotation of the connecting element is understood as meaning the regular operation of the connecting element during normal operation of the motor vehicle. In this operating state of the motor vehicle, the absorber unit preferably does not absorb any kinetic energy of the connecting element.

A motor vehicle state differing from normal operation is present, for example, if the motor vehicle impacts against an obstacle, or is involved in a rear impact. In the event of a rear impact, vehicle occupants are initially pushed rearward against the seats and the headrests because of the inertia forces before said vehicle occupants are subsequently hurled forward. As a consequence of the high acceleration forces, there is a high risk for the vehicle occupants that they will suffer a whiplash injury. Furthermore, the uncontrollable movement during the vehicle impact can result in further injuries.

The occupant loading can be substantially reduced by the absorber unit according to aspects of the invention. In the event of a vehicle impact, as a consequence of the high torques which act on the rotational bearings of the connecting element, the connecting element may exceed the predefined adjustment limit. As soon as the connecting element is rotated beyond said adjustment limit, the absorber unit absorbs the kinetic energy of the connecting element or kinetic energy introduced by means of the connecting element and therefore slowly brakes the rotational movement of the connecting element. The risk of injury for the vehicle occupants can therefore be significantly reduced.

Since the kinetic energy is substantially absorbed by the absorber unit, damage of the actual adjustment mechanism during a vehicle impact can be prevented or at least reduced. The adjustment arrangement therefore remains capable of functioning even after an impact of the vehicle and can continue to be operated without costly repair work. The absorber unit may have to be exchanged.

The structural components of the adjustment arrangement can be of substantially stiff and robust design because of the specific absorption of the kinetic energy in the absorber unit. The adjustment mechanism therefore has high mechanical stability which results in a high degree of reliability and long service life of the adjustment arrangement.

According to a preferred embodiment, the absorber unit is designed to absorb the kinetic energy by plastic deformation.

In this embodiment, the kinetic energy is converted into deformation energy, with the absorber unit being irreversibly deformed. It goes without saying that the plastic deformation can also be partially associated with an elastic deformation of the absorber unit. For example, the absorber unit can be designed as a shock absorber system/crash box which, in one embodiment, contains metallic foam. For example, ductile aluminum alloys provide excellent properties in respect of energy absorption during accidents. Depending on the design of the crash box, aluminum can absorb, for example, over 30 kJ/kg of the entire weight of a structural element. Furthermore, aluminum is a recognized lightweight material. Irrespective of the material specifically used, however, the arrangement of an absorber unit only results in a small additional weight of the adjustment arrangement.

In an alternative embodiment, the absorber unit can also be designed to convert the kinetic energy introduced into the absorber unit by means of the connecting element into heat. For this purpose, the absorber unit can have a damper unit which is designed, for example, as a hydraulic damper or as a mechanical damper. In the case of a hydraulic damper, a fluid (for example oil) located in the damper is conducted through narrow channels and valves. The resistance proffered to the fluid in the process produces differences in pressure which, via active surfaces, produce damping forces. The resulting damping work is converted into heating of the fluid. In the case of a mechanical damper, use can be made, for example, of spring-loaded friction surfaces. The friction between the spring-loaded friction surfaces damps the movement of the connecting element and, in the process, produces heat, and, in the preferred embodiment, results additionally in a reinforcement of the rail.

According to a further embodiment, the absorber unit is arranged in a rotational region of the connecting element.

At least part of the absorber unit is therefore arranged in the pivoting plane. This measure results in a particularly effective absorption of the kinetic energy introduced by means of the connecting element, if the connecting element exceeds the predefined adjustment limit.

In a preferred embodiment, the absorber unit extends to both sides of the rotational region.

By means of the specific configuration of the absorber unit, the absorption of the kinetic energy can be influenced in a specific manner. It is thus possible for a deformation behavior of the absorber unit to be defined by parameters, such as, for example, height, width and volume of the absorber unit and/or the type of material used. In other words, the rate of absorption of kinetic energy and also a profile of the energy absorption can be defined via the absorber unit, wherein the deceleration characteristics of the connecting element and therefore of the entire seat can be influenced via the profile. The shape of the absorber unit here can be designed to be symmetrical or asymmetrical or irregular relative to the rotational region or to the pivoting plane. Furthermore, the absorber unit can have beveled surfaces via which a compressive force can be introduced substantially perpendicularly to said surfaces into the absorber unit, wherein the compressive force typically acts on the absorber unit as soon as the connecting element exceeds the predefined adjustment limit. In the process, the absorber unit enters into contact, for example, with the connecting element and/or the rail.

In a preferred embodiment, the absorber unit is arranged in a rotational region of the connecting element between the connecting element and the rail.

If the connecting element exceeds the predefined adjustment limit, for example in the event of an impact of the motor vehicle, the absorber unit is clamped between the connecting element and the rail upon rotation of the connecting element. During the clamping process, the absorber unit can be deformed and can therefore absorb the kinetic energy introduced by the connecting element. By means of this measure, the connecting element and the motor vehicle seat coupled thereto can be braked in a controlled manner.

In a further embodiment, the absorber unit has a region of weakness with a predefined rigidity which is lower than the remaining regions of the absorber unit.

This measure makes it possible to increase the predictability of the deformation of the absorber unit. Furthermore, for example, a defined folding behavior of the absorber unit during the deformation can therefore be predetermined. The size, the type of shaping and/or the material properties of the region of weakness decisively determine the rigidity of the absorber unit. In consequence, the deformation behavior or the energy absorption characteristics of the absorber unit can be very precisely predetermined by means of the region of weakness.

In a preferred embodiment, the region of weakness is designed as a notch.

The notch constitutes a point of engagement for a notch effect on the absorber unit. Stressing forces, tensile forces and/or tensional forces can act on the notch. Furthermore, the rigidity of the absorber unit can be influenced in a simple manner by means of a notch. Moreover, a notch can be produced in a very simple and cost-effective manner. Since the absorber unit preferably buckles at the notch during a compressive introduction of force, a defined folding behavior of the absorber unit can be realized by means of the notch.

As an alternative to the notch, which is typically formed by a material recess on the absorber unit, the region of weakness can also be formed by a change in the material properties, such as, for example, of the modulus of elasticity. If the absorber unit is formed with a less rigid material, for example, in a predefined region (region of weakness), a notch caused by the material can therefore be provided.

According to a preferred embodiment, the notch is formed on the absorber unit in such a manner that the notch runs substantially transversely or perpendicularly with respect to a direction of movement of the connecting element.

In this embodiment, a compressive force (which is introduced into the absorber unit by the connecting element and/or the rail, for example) is exerted substantially perpendicularly to a notch profile. In consequence, pronounced increases in stress arise at the notch, said increases in stress ensuring that the absorber unit reliably buckles in the region of the notch profile. In addition, this measure ensures a highly effective absorption of kinetic energy.

According to a further embodiment, the absorber unit is formed integrally with the connecting element or with the rail.

In this embodiment, the absorber unit is manufactured as part of the connecting element or of the rail. The absorber unit can therefore be produced in a very simple manner. Separate installation of the absorber unit is not required. As a consequence, a cost-effective and simplified assembly of the adjustment arrangement arises.

According to a further embodiment, the absorber unit is designed as a separate component and is arranged on the connecting element or on the rail.

If the absorber unit is plastically deformed during a vehicle impact, the absorber unit in this embodiment can be very simply exchanged for a new absorber unit. Since the absorber unit is manufactured as a separate component, essentially no changes to the existing components of the adjustment arrangement have to be undertaken. This results in cost-effective production of the adjustment arrangement.

The absorber unit is particularly preferably arranged in a rear region of the rail, in the direction of the vehicle, or is formed integrally with said rail.

An additional reinforcement of the rail in the rear region can be achieved by this measure. The absorber unit therefore takes on at least two functions: firstly, the absorber unit can absorb kinetic energy introduced by means of the connecting element. Secondly, the arrangement of the absorber unit results in the rail being more robust. As a consequence, the reliability and the service life of the adjustment arrangement are increased.

According to a further embodiment, the adjustment arrangement has a further absorber unit which is formed or arranged on the respective other element of the connecting element or of the rail.

In this embodiment, an absorber unit is provided both on the connecting element and on the rail. The absorber unit here can be formed in each case integrally with the corresponding element. Alternatively, the absorber units can also be designed as separate components which are arranged on the connecting element and on the rail. In a further alternative configuration of the adjustment arrangement, one of the absorber units is formed integrally with the respective element whereas the other absorber unit is arranged as a separate component on the other element of the connecting element or of the rail.

Furthermore, the absorber unit and the further absorber unit can be formed in the same manner. The two absorber units can therefore be produced as identical parts and hence cost-effectively. Alternatively, the absorber unit and the further absorber unit can also be formed differently. The absorber units can therefore be optimally adapted to the respective installation position and the compressive action of force associated therewith. It is moreover possible for the two absorber units to carry out different deformation behavior (for example via differently configured notches).

Furthermore, the further absorber unit creates an additional deformation region or energy absorption region which, in interaction with the deformation region of the absorber unit, permits the absorption of greater total energy.

It goes without saying that the features mentioned above and those which have still to be explained below are usable not only in the respectively stated combination, but also in different combinations or on their own without departing from the scope of the present invention.

BRIEF DESCRIPTION OF THE DRAWINGS

Exemplary embodiments of the invention are illustrated in the drawing and are explained in more detail in the description below. In the drawing, in each case in a schematic illustration.

DETAILED DESCRIPTION OF THE INVENTION

Figure 1:
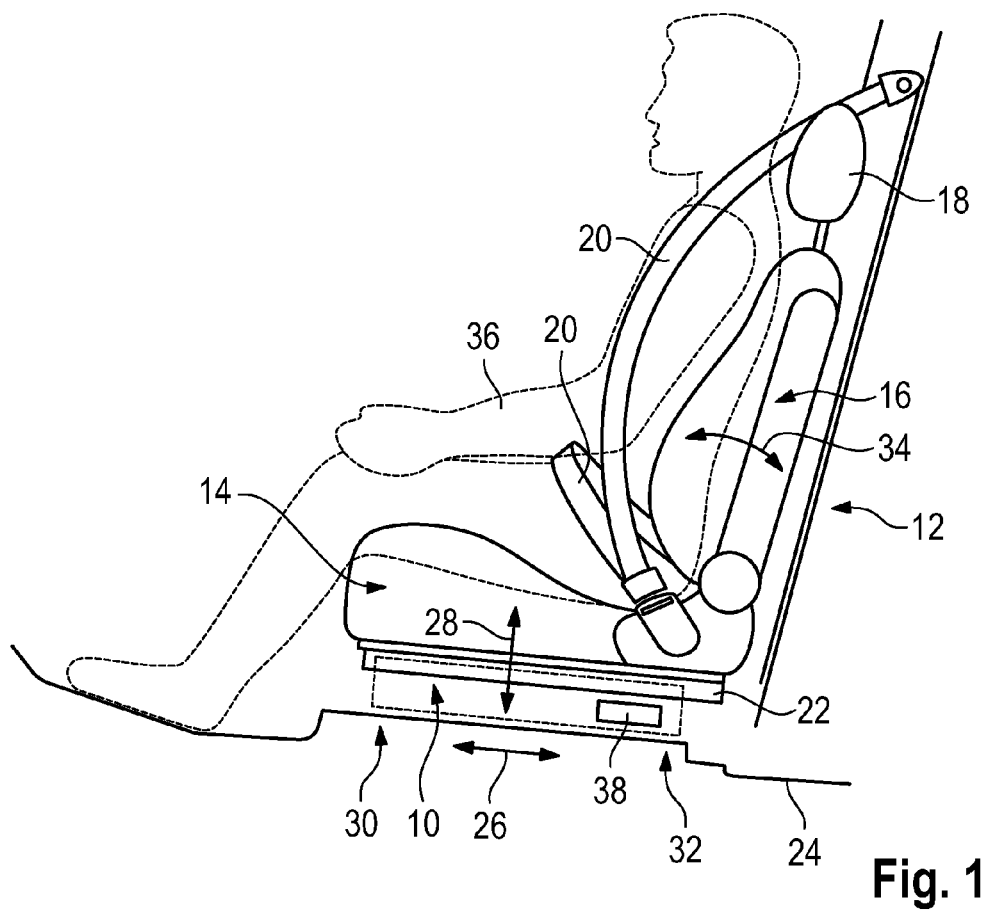
FIG. 1 shows a motor vehicle seat with an adjustment arrangement according to aspects of the invention.

FIG. 1 illustrates an adjustment arrangement 10 for a motor vehicle seat 12. The motor vehicle seat 12 is a front seat, i.e. a driver's seat or passenger's seat, of a motor vehicle, not denoted specifically in FIG. 1. However, it goes without saying that the adjustment arrangement 10 can also be used in a rear seat or else a seat bench having a plurality of individual seats.

The motor vehicle seat 12 has a seat surface 14 or a seat cushion 14, and also a seat backrest 16. Furthermore, as further safety features, the motor vehicle seat 12 has a headrest 18 and a seat belt 20.

The adjustment arrangement 10 has a seat support 22 which forms a retainer for the motor vehicle seat 12 and on which the motor vehicle seat 12 is fixed substantially rigidly. The adjustment arrangement 10 here couples the seat support 22 and therefore the motor vehicle seat 12 mechanically to a motor vehicle floor 24.

With the adjustment arrangement 10, it is possible to realize, for example, the 6-way seat adjustment mentioned at the beginning or else what is referred to as an 8-way seat adjustment which provides a horizontal forward and backward movement (see arrow 26), a vertical upward and downward movement (see arrow 28) and an independent upward and downward movement in a front and/or rear region 30, 32 of the adjustment arrangement 10 and also a pivoting movement (see arrow 34) of the seat backrest 16 with respect to the seat surface 14.

The adjustment of the motor vehicle seat 12 by means of the adjustment arrangement 10 can be carried out either purely mechanically via corresponding cranks or levers or else with the support of electric motors.

However, it goes without saying that the invention described below can be used both in a manual and in a motor-operated adjustment arrangement 10. Furthermore, the invention is usable independently of the degree of freedom of the seat adjustment (4-way seat adjustment, 6-way seat adjustment, etc.).

The invention will be explained below using the example of a rear impact. In the event of a following vehicle impacting against the rear of the motor vehicle, a vehicle occupant 36 on the motor vehicle seat 12 is initially thrown against the seat backrest 16 and the headrest 18 because of the inertia forces before said vehicle occupant is subsequently hurled forward into the seat belt 20. There is a risk of injury for the vehicle occupant 36 because of the acceleration forces occurring in the process. Furthermore, very high compressive forces occur in particular in the rear region 32 of the adjustment arrangement 10. There is therefore the risk of structural components of the adjustment arrangement 10 being damaged and therefore having to be exchanged. According to aspects of the invention, the adjustment arrangement 10 therefore has an absorber unit 38 which is designed to absorb the compressive forces introduced into the adjustment arrangement 10 or corresponding kinetic energy. The movement of the motor vehicle seat 12 can therefore be braked slowly and in a specific manner during a vehicle impact. This results in a significant reduction in occupant loading and, in consequence, reduces the risk of injury of the vehicle occupant 36.

Furthermore, by means of the specific absorption of the kinetic energy in the absorber unit 38, it can be ensured (or at least the risk reduced) that the remaining elements of the adjustment mechanism of the adjustment arrangement 10 are not damaged by the compressive forces introduced. Therefore, after a vehicle impact, all that is required is for the absorber unit 38 to be exchanged. The actual adjustment mechanism of the adjustment arrangement 10 remains capable of functioning, however, even after a vehicle impact. The adjustment arrangement 10 therefore has a high degree of reliability and a long service life.

In addition, the absorber unit 38 results only in a small additional weight of the adjustment arrangement 10 and therefore supports a lightweight construction of the motor vehicle seat 12.

Although the adjustment arrangement 10 has been described with reference to a rear impact, it goes without saying that the same principle can also be used in the case of other types of impact of the motor vehicle. In particular, the absorber unit 38 can be arranged in other regions of the adjustment arrangement 10, for example, in the front region 30, in order to absorb the kinetic energy introduced into the adjustment arrangement 10, in particular during a vehicle impact. Furthermore, there is the possibility of also arranging a plurality of absorber units 38 on the adjustment arrangement 10. The absorber units 38 can therefore be designed here as identical parts or else can have different forms/designs.

Figure 2:
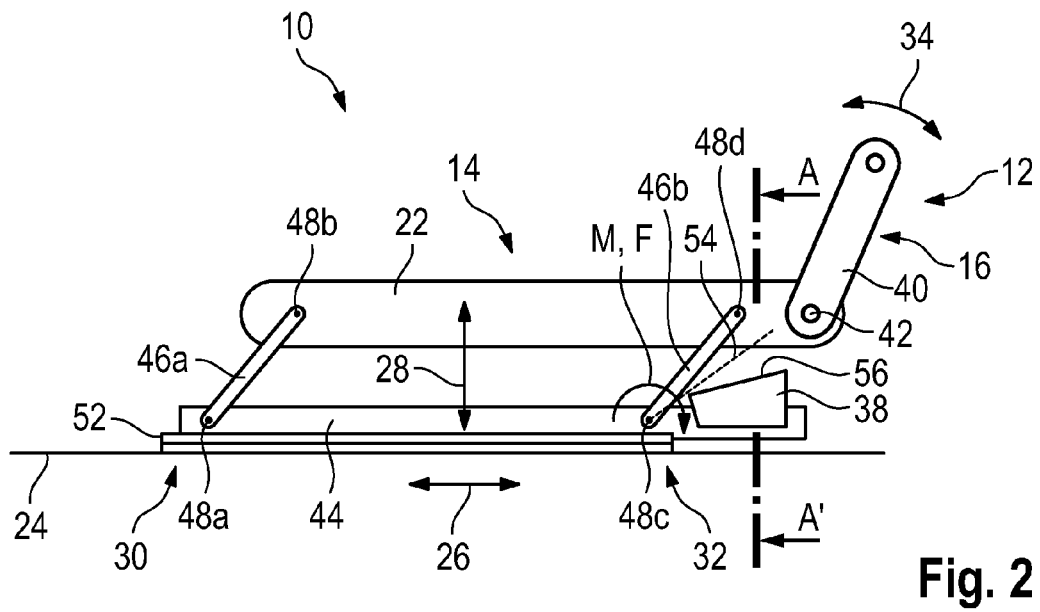
FIG. 2 shows a detailed view of the adjustment arrangement.

FIG. 2 shows a detailed view of the adjustment arrangement 10. Only a left side of the adjustment arrangement 10 or of the vehicle seat 12 is illustrated in FIG. 2. The right side of the adjustment arrangement 10/of the motor vehicle seat 12 can be designed analogously to the left side. Alternatively, however, there is also the possibility of undertaking certain modifications on the right side of the adjustment arrangement 10. For example, the absorber unit 38 can be differently configured or else can be arranged at another position. It goes without saying that a person skilled in the art can undertake further modifications without departing from the scope of the invention.

According to the embodiment of the motor vehicle seat 12 that is shown in FIG. 2, the seat backrest 16 has a frame component 40 which is coupled rotatably to the seat support 22 via a rotary bearing 42. The pivotability (see arrow 34) of the seat backrest 16 in relation to the seat support 22 is ensured via the rotary bearing 42.

The seat support 22 is connected to a rail 44 by means of connecting elements 46a, 46b, one at the front in the direction of travel of the motor vehicle and one at the rear, in the manner of a 4-joint coupling mechanism. In this case, first sections of the connecting elements 46a, 46b are mounted rotatably on the rail 44 via rotary bearings 48a, 48c and second sections of the connecting elements 46a, 46b are mounted rotatably on the seat support 22 via rotary bearings 48b, 48d. The rotary bearings 48 define a pivoting plane 50, within which the connecting elements 46a, 46b are pivotable or rotatable. The pivoting plane 50 is merely illustrated in FIG. 3 because of the perspective selected in FIGS. 2 and 3. The pivoting plane 50 extends perpendicularly to the plane of the drawing illustrated in FIG. 3. By means of the pivoting of the connecting elements 46a, 46b within the pivoting plane 50, a different height (see arrow 28) of the motor vehicle seat 12 can be set. Furthermore, there is the possibility of orienting the seat support 22 or the seat cushion 14 obliquely relative to the vehicle floor 24. For this purpose, the seat support 22 can be set to a different height in the front region 30 than in the rear region 32.

The rail 44 is mounted on a floor rail 52 so as to be displaceable in a longitudinal direction of the motor vehicle and therefore enables the motor vehicle seat 12 to be displaced in the horizontal direction (see arrow 26). The floor rail 52 is fixed here on the vehicle floor 24 via corresponding fastening elements.

In the embodiment illustrated in FIG. 2, the absorber unit 38 is arranged in the rear region 32 of the adjustment arrangement 10, specifically in a rotational region of the connecting element 46b (or in the pivoting plane 50) between the connecting element 46b and the rail 44. The absorber unit extends to both sides of the rotational region/pivoting plane 50 (also see FIG. 3) and is designed as a separate component which is arranged on the rail 44. Alternatively, the absorber unit 38 can also be formed integrally with the rail 44. The rail 44 is reinforced by the arrangement of the absorber unit 38 in the rear region 32 of the adjustment arrangement 10. This reinforcement is advantageous in particular whenever the vehicle seat 12 is moved into a rear end position, as illustrated in FIG. 2.

During normal operation of the motor vehicle, the connecting elements 46a, 46b can be functionally rotated or pivoted relative to the seat support 22 and/or to the rail 44 up to a predefined adjustment limit 54 (the adjustment limit 54 only for the rear connecting element 46b is shown in FIG. 2). During normal operation of the motor vehicle, the adjustment limit 54 therefore constitutes a natural stop up to which the adjustment arrangement 10 can be adjusted.

If the motor vehicle is abruptly accelerated (for example, impact of the vehicle against a vehicle traveling in front or impact of a following vehicle against the rear of the vehicle), very high forces act on the motor vehicle seat 12, said forces becoming perceptible, inter alia, as high torques about the rotary bearings 42, 48. FIG. 2 shows, by way of example, a moment M on the rotary bearing 48c, by means of which the connecting element 46b is pressed in the direction of the adjustment limit 54. This moment M arises, for example, in the event of a rear impact, in which a following vehicle collides with the motor vehicle. If the moment M is very high (for example, in the event of a vehicle impact), the functional adjustment limit 54 is exceeded and the connecting element 46b is pressed against the absorber unit 38. In consequence, the absorber unit 38 is plastically deformed and converts at least some of the kinetic energy, which is introduced into the absorber unit 38 by means of the connecting element 46b, into deformation energy. Alternatively or in addition, there is the possibility of the absorber unit 38 having a damper element, by means of which at least some of the kinetic energy is converted into heat.

As can be gathered from FIG. 2, in the embodiment shown, the absorber unit 38 has a beveled surface 56. As a result of the beveled surface 56, the force F can be introduced substantially perpendicularly into the absorber unit 38. This permits particularly effective absorption of the kinetic energy.

Figure 3:
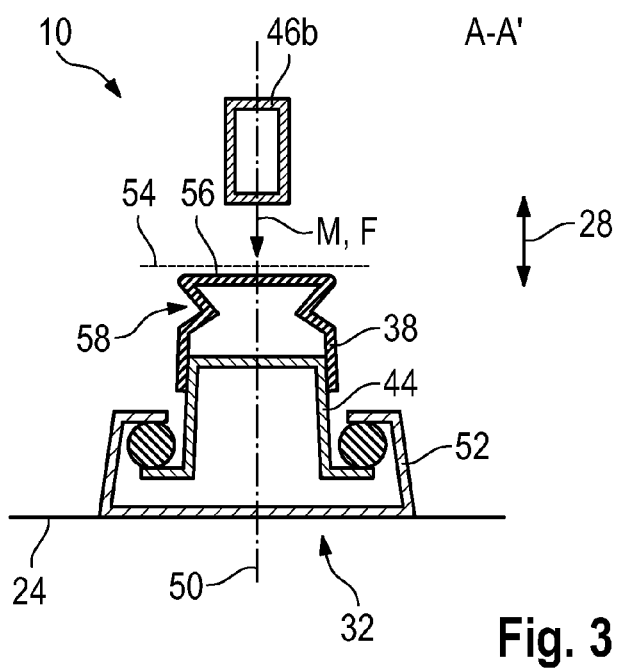
FIG. 3 shows a sectional view of the adjustment arrangement illustrated in FIG. 2.

FIG. 3 shows a sectional view of the adjustment arrangement 10, which is illustrated in FIG. 2, along a line indicated by A-A'. It can be seen from this perspective that the absorber unit 38 preferably has a less rigid region of weakness 58. In the present exemplary embodiment, the region of weakness 58 is designed as a notch 58. In an alternative embodiment of the absorber unit 38, the region of weakness 58 can also be formed from a less rigid material.

The notch 58 preferably runs transversely with respect to a direction of action of the force F, and therefore said force is introduced into the absorber unit 38 substantially perpendicularly to a direction in which the notch 58 extends. With the aid of the notch 58, a defined folding behavior of the absorber unit 38 during the plastic deformation of the absorber unit 38 can be realized. The notch 58 here can also be used as a predetermined breaking point, and therefore the absorber unit 38 fails in a specific and predictable manner at this point. Possible damage to the rest of the adjustment arrangement 10 and/or to the vehicle seat 12 can therefore be avoided or at least reduced.

What is claimed:

1. An adjustment arrangement for a seat of a motor vehicle, comprising:
   a rail which is mounted displaceably in a longitudinal direction of the motor vehicle relative to a frame of the motor vehicle, a seat support which forms a retainer for the seat, a connecting element which mechanically couples the seat support to the rail, wherein a first section of the connecting element is mounted on the rail so as to be rotatable in a predefined pivoting plane, wherein a second section of the connecting element is mounted on the seat support so as to be rotatable in the pivoting plane, and wherein the connecting element is functionally rotatable relative to the seat support and/or to the rail up to a predefined adjustment limit, and an absorber unit which is positioned to be contacted by the connecting element and compressed between the connecting element and the rail to absorb kinetic energy introduced by the connecting element when the connecting element exceeds the predefined adjustment limit as the seat support moves toward the rail, wherein the absorber unit is separated from the connecting element along at least a portion of the predefined pivoting plane.

2. The adjustment arrangement as claimed in claim 1, wherein the absorber unit is designed to absorb the kinetic energy by plastic deformation.

3. The adjustment arrangement as claimed in claim 1, wherein the absorber unit is arranged in a rotational region of the connecting element.

4. The adjustment arrangement as claimed in claim 3, wherein the absorber unit extends to both sides of the rotational region.

5. The adjustment arrangement as claimed in claim 1, wherein the absorber unit is arranged in a rotational region of the connecting element between the connecting element and the rail.

6. The adjustment arrangement as claimed in claim 1, wherein the absorber unit has a region of weakness with a predefined rigidity.

7. The adjustment arrangement as claimed in claim 6, wherein the region of weakness is a notch.

8. The adjustment arrangement as claimed in claim 7, wherein the notch is formed on the absorber unit in such a manner that the notch runs substantially transversely with respect to a direction of movement of the connecting element.

9. The adjustment arrangement as claimed in claim 1, wherein the absorber unit is formed integrally with the rail.

10. The adjustment arrangement as claimed in claim 1, wherein the absorber unit is designed as a separate component and is arranged on the rail.

* * * * *